June 16, 1942.  W. E. AMBERG  2,286,182
CONSTANT VELOCITY UNIVERSAL JOINT
Filed Dec. 15, 1938  2 Sheets-Sheet 1
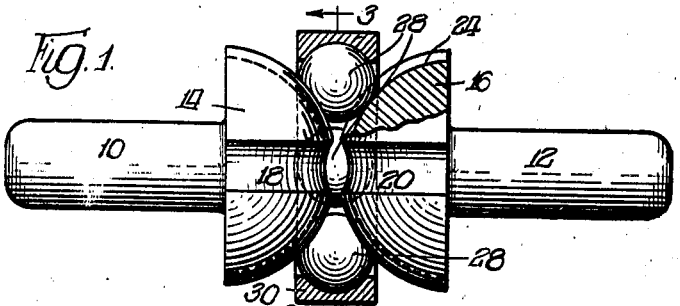
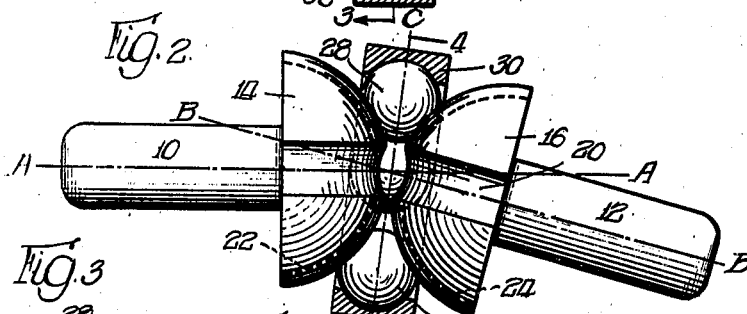
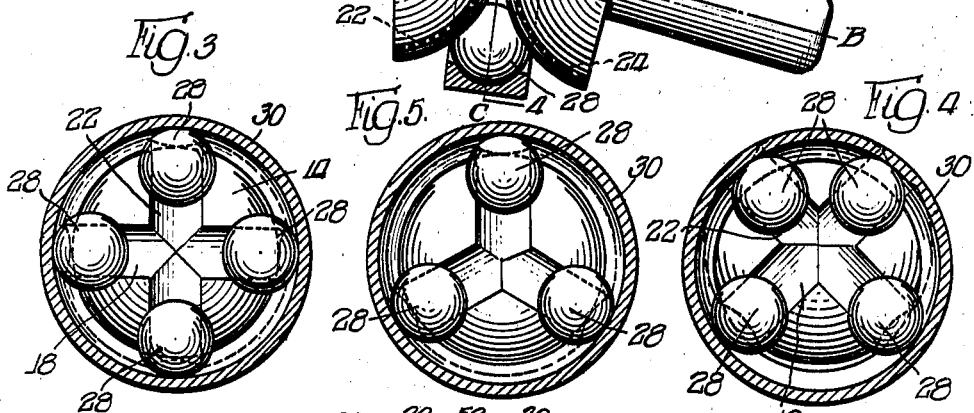
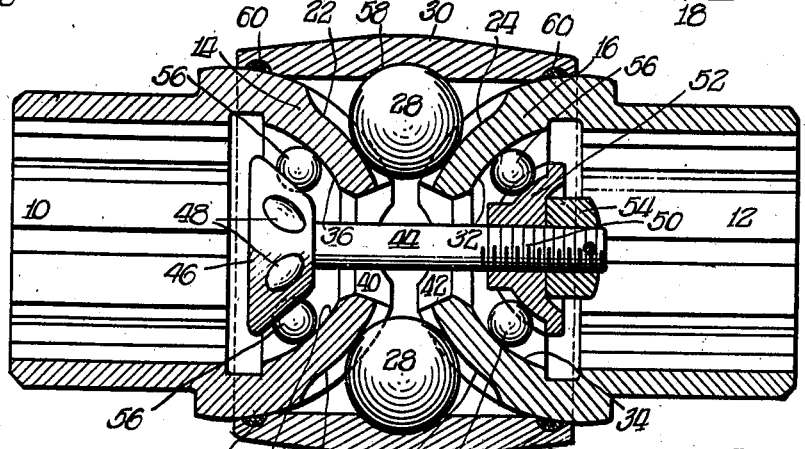
INVENTOR.
Walter E. Amberg.
BY
ATTORNEY.

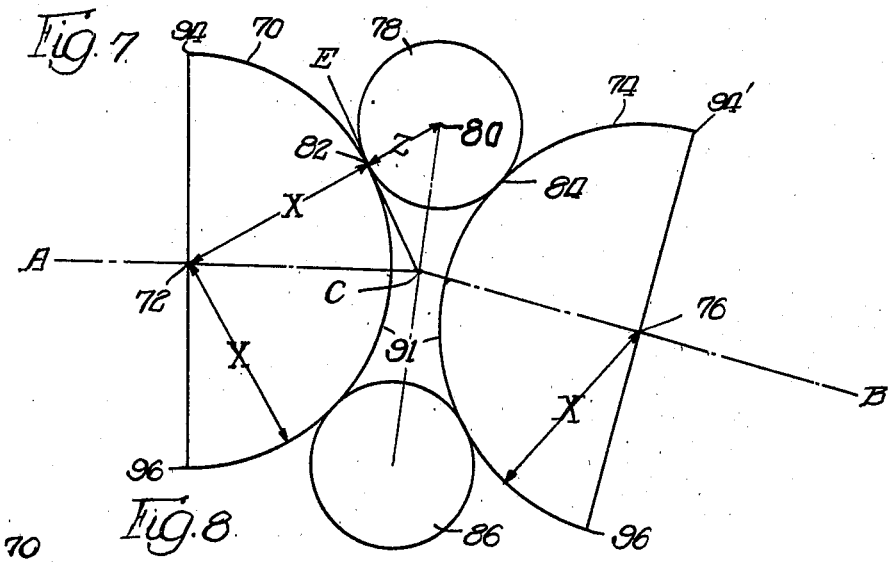
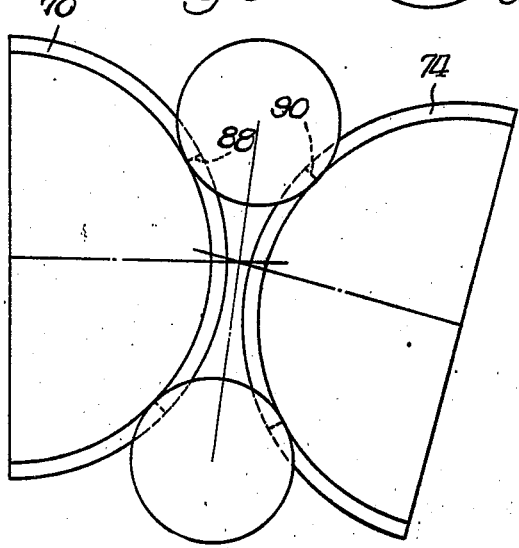

Patented June 16, 1942

2,286,182

UNITED STATES PATENT OFFICE 2,286,182

CONSTANT VELOCITY UNIVERSAL JOINT

Walter E. Amberg, Chicago, Ill.

Application December 15, 1938, Serial No. 245,805

14 Claims. (Cl. 64—21)

This invention relates to universal joints, and more particularly to universal joints for coupling together sections of shafting where it is desired to transmit uniform velocity from a driving to a driven section. Joints of this type are generally known as "constant velocity universal joints" and this term will be hereinafter employed in referring to joints embodying these characteristics.

It is well known that where two shafts are coupled by a single universal joint, such, for example, as the Hooke joint, with their axis inclined to one another and uniform rotary motion is imparted to one shaft, the other will not revolve with a similar uniform velocity; but, on the contrary, during one quarter of its revolution its velocity will progressively increase and during the next quarter it will correspondingly decrease, followed by a like accelerated movement through the third quarter and a similar decreasing velocity through the last quarter.

It has further been demonstrated that if an intermediate revoluble member be interposed between the two shafts, with the ends of which the ends of the respective shafts may be coupled by universal joints, a velocity may be imparted to the driven shaft through such intermediate member which will be concurrent and synchronous with that of the driving shaft as long as equiangularity between the axis of the intermediate member and the respective axes of the two connecting shafts is maintained. When this equiangularity is preserved in action and the velocity of the driving shaft is regular and uniform, the velocity of the intermediate member will exhibit the variableness and irregularity above described, but by reason of the similar but inverted conditions appertaining to the transmitting connection with the driven shaft this irregular velocity will be transmuted into a movement and velocity which will be both concurrent and synchronous with that of the driving member. Heretofore various provisions for maintaining this condition of equiangularity under various conditions of practical use have been proposed but as a rule they have been unsuccessful. Early proposals were directed mainly toward so-called double universal joints of the character just described in which the driven shaft and the driving shaft had an intermediate member interposed between them, but these are generally unsatisfactory for modern usage because of the complexity of the structure, or the cost thereof, or for the reason that the joint occupies too much space in modern machinery, such, for example, as the motor car, or because friction or wear destroys the uniform action of the joint, or for other reasons. An example of an early type of double universal joint of this character may be found by referring to United States Letters Patent No. 724,068, granted March 31, 1903, to H. D. Williams. More recently effort has been made to develop what may be termed a unitary universal joint for transmitting constant velocity from the driving to the driven member, and an example of a joint of this type may be found by referring to United States Letters Patent No. 1,916,442, granted July 4, 1932, to A. H. Rzeppa.

As stated above, one of the difficulties encountered in connection with constant velocity universal joints resided in the fact that the velocity of the driving shaft was imparted to the driven shaft only so long as equiangularity between the axis of the intermediate member and the axes of the driving and driven shafts was maintained. In the first Letters Patent referred to above there is disclosed an intermediate member in the form of a supplemental loose coupling member which connected the extremity of the two shafts by telescopic joints at points in their axes equidistant from the centers of the positive coupling joints. The function of this member was to maintain equiangularity between the axis of the intermediate member and the respective axes of the two connecting shafts. The construction disclosed in this patent, while operable, is unduly complex, expensive to manufacture and is easily subject to wear, resulting in non-uniformity of motion with attendant vibration. Also it will be seen that in the patent referred to the equalizer serves no function whatsoever in so far as the transmission of motion from the driving member to the driven member is concerned. Its sole purpose is to afford equiangularity between the shafts and the intermediate member, and to impart the driving motion from one shaft to the other the customary perpendicular joints are employed.

With the foregoing desiderata in view, an object of the present invention resides in the provision of a simple and efficient means which serves not only as an equalizer to insure the fact that the motion of one shaft is identically imparted to the other, but also affords a driving connection between the two shafts. The intermediate member which is provided in the present invention comprises, generally speaking, a ball-race and a plurality of ball-bearings, and the ends of the shafts terminate in oppositely facing spherical extremities provided with ways to receive the balls that are carried by the intermediate member, and the parts cooperate in such a manner that the axis of the annular ball-race is at all times in an equiangular relation with respect to the axes of the driving and driven shafts.

Another object of the invention resides in the provision of a constant velocity universal joint which is simple in design and construction and economical from the standpoint of manufacturing cost. As herein disclosed the ends of the driving and driven shafts terminate in spherical extremities, are grooved to form raceways, and balls or roller bearings are dropped into these grooves and held in position by means of a suitable raceway. These intermediate members, namely, the ball bearings serve a dual function. In the first place, they act as equalizers to assure equiangularity between the axis of the raceway and the axes of the driving and driven shafts, and additionally, they transmit the rotary motion from the driving shaft to the driven shaft. As disclosed herein, the joint is provided with means for maintaining the parts in assembled relationship, but this feature may, for purposes of the present discussion, be considered subsidiary.

Another object of the invention resides in the construction of a universal joint of this type which reduces wear and friction to a minimum and assures accuracy and precision in operation during and after long periods of usage. It is well known that roller bearings and raceways within which they move present point-to-point contact and reduce friction and wear to a minimum. Also the wear that takes place is more or less uniform in character, with the result that the joint will continue to function with precision after the parts have been worn.

Other objects and features of the invention will become apparent from a reading of the following specification in the light of the accompanying drawings, in which—

Figure 1 is a diagrammatic view, in side elevation, partly in section, of a joint constructed in accordance with the principles of the present invention;

Figure 2 is a view similar to Figure 1 except that the angular position of one of the shafts has been varied;

Figure 3 is an end view in section taken along the line 3—3 of Figure 1;

Figure 4 is a view similar to Figure 3 taken along the line 4—4 of Figure 2;

Figure 5 is a view of a modified form of joint in which the raceways are positioned at angles of 120° as contrasted with angles of 90° in the earlier figures;

Figure 6 illustrates a complete, assembled universal joint embodying the principles that are shown diagrammatically in the preceding figures.

Figure 7 is a schematic representation of the structure shown in Figure 2 for the purpose of illustrating certain principles;

Figure 8 is a schematic representation of the upper half of the structure shown in Figure 2 for the purpose of illustrating the contact points of the balls.

In the ensuing description the principles of the new joint will first be explained by reference to diagrammatic Figures 1 to 5, inclusive, and thereafter Figure 6 will be described in which the principles of the preceding figures are incorporated into a complete and operative assemblage.

As shown in Figure 1, a plurality of shafts 10 and 12 are in axial alignment and the purpose of the present invention is to couple the two shafts together in such a way that the angularity of one shaft with respect to the other may be varied, yet rotary motion may at all times be imparted from one shaft to the other uniformly and precisely irrespective of variations in the angular position of the shafts. Let us assume that shaft 10 is a driving shaft, in which instance shaft 12 becomes a driven shaft, and that during use the angular position of the shafts with respect to one another will vary, such, for example, as indicated in Figure 2 in which the driven shaft 12 is lowered approximately 15°. The rotary driving shaft 10 and the driven shaft 12 terminate in oppositely facing hemispherical extremities 14 and 16 which are provided with grooved raceways 18, 20 and 22, 24. In the position illustrated in Figures 1 and 2 the raceways 18 and 20 extend horizontally, whereas the raceways 22 and 24 lie perpendicularly or at right angles with the former raceways and extend vertically. Of course it will be understood that whether these raceways extend horizontally or vertically depends entirely upon the position of the hemispherical members 14 and 16, and for purposes of convenience in description only they are shown in the position illustrated. As shown in Figure 3 the horizontal raceway or groove 18 intersects with the vertical raceway 22 at a point on the surface of the sphere coinciding with the axis of the shaft 10, and the same is true of the hemispherical member 16 in which the horizontal guideway 20 intersects at right angles the vertical guideway 24. In effect, therefore, the exterior convex surfaces of the spherical members 14 and 16 are merely provided with two circumferential grooves extending at right angles to one another. In order to couple the two shafts together so that driving motion imparted to the shaft 10 will be transmitted to the driven shaft 12, a plurality of balls or ball bearings 28 are dropped into the oppositely facing complementary guideways 22, 24 and 18, 20, and these balls are held in position by means of a suitable annular raceway 30.

The number of grooves or raceways formed in the convex exteriors of the spherical members 14 and 16 is not vital, as shown, for example, in Figure 5 in which the raceways converge at a central point but extend along axes lying at 120° from one another rather than as shown in Figures 1, 2 and 3 in which the raceways are disposed at 90° from one another. Furthermore, the number of raceways may be increased to any desired number without departing from the invention.

The ball bearings 28 and the raceway 30 may be considered as a unit and when so considered the unit serves two purposes. First, it acts as an equalizer, and second, it is a connecting device which serves to transmit motion from one shaft to the other. In operation, as long as the central axis of the raceway 30 is disposed at equal angularity with respect to the axes of the shafts 10 and 12 the requirements of a constant velocity universal joint are completely met and uniform motion imparted to the shaft 10 will be transmitted accurately and precisely to the shaft 12. In the position shown in Figure 1 the central axis of the raceway, which may be termed the intermediate member, coincides with the axes of the shafts 10 and 12 which are in alignment with one another. In the position shown in Figure 2 the shaft 12 has been lowered in such a manner that its axis B—B no longer lies in alignment with the axis A—A of shaft 10, but is disposed at approximately 15° thereto. As the shaft 12 descends, however, the intermediate member 30 is tilted in the manner illustrated in Figure 2 and the central plane C—C (a plane which may be termed a vertical plane and which passes midway between opposite sides of the intermediate member 30 at right angles to the central axis of the intermediate member) is intersected by the axis B—B of the shaft 12 and the axis A—A of shaft 10 at equal angles, and the point of intersection of the axis A—A and B—B will always be within the plane C—C. This means, of course, that the angularity between the axes of the shafts 10 and 12 and the central axis of the intermediate member will be equal, thereby assuring the transmission of uniform velocity from the driving shaft 10 to the driven shaft 12.

The tilting action of the intermediate member and the resultant equiangularity between the central axis of this member and the axes of the shafts 10 and 12 is caused by the action of ball bearings within the grooves or raceways 18, 22 and 20, 24. Thus, as the shaft 12 descends from the position shown in Figure 1 to that shown in Figure 2 the upper opposite surfaces of the spheres 14 and 16 are separated, permitting the upper ball bearing 28 to descend and allowing the intermediate member 30 also to descend. Similarly, the lower oppositely disposed surfaces of the spheres move in the direction of one another, thereby decreasing the distance between them, forcing the lower ball bearing 28 to descend, carrying with it the intermediate member 30. This brings about the tilting action and no matter what the angular displacement may be between the axes of the shafts 10 and 12, the central axis of the intermediate member 30 will always be disposed at equal angles with respect thereto. Thus, the intermediate member, namely, the raceway 30 and the ball bearings 28, comprise an equalizer, the function of which is to equalize the angles between its own central axis and the axes of the shafts 10 and 12. The term equalizer is well known in this art and it is employed herein in the connection mentioned and in the customary sense without a separate explanation accompanying each usage of the term.

In addition to serving as an equalizer the intermediate member 30, comprising the raceway and the ball bearings, also serves the function of connecting the two shafts in such a manner that motion imparted to one is transmitted to the other. Thus, consider for example, the lowermost ball 28 in Figures 1 and 2. As the shaft rotates this ball serves in effect as a tooth imparting from sphere 18 to sphere 20 exact and identical rotation. As the shaft 10 is rotated an eighth of an inch this exact and precise rotary motion is imparted to the shaft 12 because, as stated, each ball bearing serves the same function in this case as a tooth, but where teeth would become separated in the event of angular displacement of the shafts 10 and 12 the ball bearings avoid such displacement, compensate for it and equalize the angular displacement, thereby causing constant velocity to be imparted from one shaft to the other irrespective of the nature or degree of the displacement of either shaft with respect to the other. Although for purposes of clarity the discussion just concluded describes the parts shown in Figures 1 and 2 without reference to the fact that they are rotating constantly while the angular displacement of the shaft 12 occurs, it will be understood that such rotation does take place and the fact that it does will in no wise change the accuracy of the description as given.

The foregoing description has been devoted to the principles of the joint and from a perusal of it the reader will appreciate and understand the inherent simplicity of design, construction and operation of this joint. In commercial constructions or embodiments, however, it is necessary to include not only principles but also practical considerations, and a practical consideration which has been omitted from the description so far given is that of tying together the two shafts 10 and 12 to maintain them in alignment with one another and prevent accidental displacement of one with respect to the other during operation. To this end a construction of the type disclosed in Figure 6 may be employed, although it must be realized that an infinite number of variations in construction and design may be employed without departing from the spirit or underlying principles of the invention as outlined herein and as set forth in the claims that follow this specification.

In Figure 6 like reference numerals will be employed to designate like parts illustrated in the earlier figures, and accordingly, as shown, a hollow driving shaft 10 of the type employed in automobile driving shafts has associated with it a hollow driven shaft 12. The inner opposite extremities of the shafts 10 and 12 have been shaped in any suitable manner to form oppositely facing spherical surfaces 14 and 16 on the outer convex surfaces of which are provided raceways 22 and 24. Ball bearings 28 are positioned within the raceways and are held in place by means of an intermediate member 30. So much as has just been described has been shown in the earlier figures, but in order to maintain the parts in assembled position the joint is provided with means which will now be described and which have not been disclosed in the earlier discussion.

The immediately adjacent surfaces of the spherical extremities 14 and 16 of the shafts are cut away as indicated by the reference numerals 40 and 42 to provide axial openings extending into the hollow interiors of the shafts. A tie-bar or connecting bolt 44 is arranged to extend through the openings 40 and 42 and at one extremity is provided with a flared out portion 46 having ball bearing recesses 48 formed therein and the opposite extremity is screw threaded as indicated at 50 to receive a cooperating member 52 and a lock nut 54. The hollow interiors of the spherical extremities 44 and 46 afford concave hollow spherical surfaces 32, 34 and 36, 38 and roller bearings 56 are positioned between these surfaces and the members 46 and 50 to hold the parts in assembled position and in proper alignment with one another. The intermediate member 30 is provided with an annular groove 58 for the reception of the ball bearings 28 and with suitable packing 60 to prevent the escape of a lubricant from the interior of the joint.

In Figure 7, it will be noted that the track 70 is curved about the center 72 upon the radius X, and the track 74 about the center 76 upon the same radius X. The axis A intersects the axis B at C. The center of a ball 78 is equidistant from the axis A or axis B. The ball 78 having a center 80 engages the curved tracks 70 and 74 at 82 and 84. Moreover, the point of contact 82 must always be in a line between the center 72 and the center 80 of the ball 78, because the track 70 and the surface of the ball 78 are both circular, and inasmuch as the radius X passes through the point 82 and is at right angles to the tangent E, and inasmuch as the radius Z of the ball 78 engages the same point 82 and is at right angles to the tangent E, it follows that the radii X and Z fall within a line. The distance between the tracks 70 and 74 at the point C, which is the intersection of the axes A and B, is less than the diameter of the ball 78. It is apparent that the distances of the center 80 of the ball 78 from either center 72 or 76 will always be the same so long as the ball 78 engages simultaneously the tracks 70 and 74. The distance will be the radius X plus the radius Z. Thus, in the case of a ball 86, which is positioned oppositely to the ball 78, the distance of its center from either center 72 or center 76 is the same as the distance from either center to the center of the ball 78, although the distance of the ball 78 from the intersection of the axes A and B is much less than the distance of the ball 86 from that center C.

It will further be noted by referring to Figure 8 that the ball 78 engages the track 70 at some point as 88 and engages the track 74 at some point as 90. Inasmuch as the tracks 70 and 74 are of an identical depth, it follows that the point 88 is the same distance from the center 72 as the point 90 is from the center 76, and is the same distance from the axis A as the point 90 is from the axis B. It follows that no matter what position the ball 78 may take in reference to the two tracks 70 and 74, so long as it is in engagement simultaneously with both tracks, the point 88 will move around the axis A at exactly the same speed as the point 90 moves around the axis B, which constitutes constant velocity.

Continuing to refer to Figures 7 and 8, attention is directed to the fact that the balls 78 and 86 must move inwardly and outwardly in reference to the intersection point C, and that as long as they are maintained by some means in engagement with the tracks 70 and 74, the tracks themselves will cause the balls to move outwardly. This is evident when one considers the ball 86 which has been forced downwardly and outwardly by the two tracks 70 and 74 drawing closer together at points such as 91.

The size of the balls that may be used will vary between a low limit which will have a diameter just exceeding the shortest distance between the tracks 70 and 74, and a maximum size wherein they are pushed so far away from the point of intersection C that they contact the tracks 70 and 74 at points approaching the points 94, 94 and 96, 96 which are drawn through the centers 72 and 76 at right angles respectively to the axes A and B. As the driving elements such as 78 and 86 become larger their point of contact with the adjoining raceways gets closer and closer to the points 94, 94' and 96, 96' with the result that they cease to function progressively less effectively for maintaining the driving element at equi-distant points from the centers 72 and 76 with the result that the driving element will assume one angle to the axis A and a different angle to the axis B. The moment this point is reached, the intermediate revoluble member loses its self-equalizing capacity in reference to the axes of the two members.

It will be noted that the balls constitute driving members or connecting driving elements and that their ball shape is of importance only insofar as problems of friction are concerned. From the standpoint of describing them as elements which form a driving coupling between two rotatable shafts, the terms "keys" or "teeth" may well be utilized.

The entire assembly comprising the balls and retaining raceway 30 may very well be described as a floating driving element in analogy to the assemblies in floating rear axles. The balls and external raceway adjust themselves to changes in angularity between the two shafts.

In conclusion it may be repeated that an infinite number of variations in design and construction may be developed without departing from the underlying principles of the present invention. Thus, the ball bearings 28, 28 may be tied together in any suitable manner or double ball bearings may be employed instead of the single bearing 28, in which instance the double ball bearings would be separated by a suitable intermediate housing member. In any of these constructions, however, the members interposed between the oppositely facing spherical surfaces would serve as teeth to transmit accurately and precisely motion from one shaft or spherical surface to the other shaft or spherical surface. Although the construction herein shown and described permits a remarkably high degree of variation in angularity between the driving and driven shafts to take place, there may be instances in which it may be desirable to permit angular variation between the shafts up to 90° or even higher. In such an instance the shafts 10 and 12 may be separated and an intermediate sphere interposed between them serving as an idler, in which instance the shaft 12 would be coupled to the intermediate sphere by means of the intermediate member 30 and the grooves or raceways herein described, and the shaft 10 would likewise be connected to the opposite side of the sphere by means of an intermediate member 30 and the raceways referred to. In a construction of this type the shaft 12 could be displaced with respect to the sphere up to, let us say, 45° or more, and likewise the shaft 10 could be displaced with respect to the intermediate sphere to an equal extent, thereby resulting in doubling the permissible amount of angular displacement between the shafts as shown and described in this application. Essentially, therefore, it may be said that the invention resides in forming convex spherical extremities on the driving and driven shafts and in tying these spherical surfaces together by means of an intermediate member which serves both as an equalizer and as a driving connection. As herein described and as fundamentally employed, the intermediate member will serve as a tooth which permits free angular displacement between the shafts and the spherical surfaces and at the same time connects the two surfaces in such a way that rotation imparted to one is transmitted uniformly to the other.

Inasmuch as raised paths might be employed in lieu of the grooves in the spherical members, the generic term "track" will be employed in the claims to indicate either type of construction.

Having thus described the invention, what I claim as new and desire to secure by Letters Patent of the United States is:

1. A single constant velocity universal joint, comprising, in combination, a driving shaft, a driven shaft, a spherically shaped portion affixed to the extremity of the driving shaft, a similar spherically shaped portion affixed to the extremity of the driven shaft, a track formed on the outer convex surface of the spherically shaped portion of the driving shaft, said track being arranged to extend in the direction of the central longitudinal axis of the driving shaft, a complemental track formed on the outer convex surface of the spherical portion of the driven shaft, and intermediate means cooperating with said tracks to afford a driving connection therebetween, said means comprising a ball engaging simultaneously complemental tracks of the driving and driven shafts.

2. A single constant velocity universal joint, comprising, in combination, a driving shaft, a driven shaft, a spherically shaped portion affixed to the extremity of the driving shaft, a similar spherically shaped portion affixed to the extremity of the driven shaft, a track formed on the outer convex surface of the spherically shaped portion of the driving shaft, said track being arranged to extend in the direction of the central longitudinal axis of the driving shaft, a complemental track formed on the outer convex surface of the spherical portion of the driven shaft, and intermediate means cooperating with said tracks to afford a driving connection therebetween, said means comprising a ball engaging simultaneously complemental tracks of the driving and driven shafts and a raceway for confining said ball.

3. A universal joint comprising, in combination, a driving member and a driven member in end-to-end relationship, complemental guideways disposed in facing relationship in adjacent ends of the driving and driven members, the guideways on each driving or driven member lying in a plurality of planes containing the axis of said member and having a longitudinal direction away from a beginning point on the axis at the end of the member toward an end point on the member such that an angle formed between the axis of the member and a line connecting the beginning and end points will be less than 90°, and connecting means mounted between facing guideways and cooperating with the guideways to afford a driving connection therebetween.

4. A universal joint comprising, in combination, a driving member and a driven member in end-to-end relationship, a plurality of raceways disposed in facing relationship in the adjacent ends of the driving and driven members to provide pairs of complementary raceways, the raceways on each driving or driven member lying in a plurality of planes containing the axis of said member and having a longitudinal direction away from a beginning point on the axis at the end of the member toward an end point on the member such that an angle formed between the axis of the member and a line connecting the beginning and end points will be less than 90°, and a ball riding in each pair of complementary raceways to afford a driving connection therebetween.

5. A constant velocity universal joint comprising, in combination, a driving member and a driven member having ends in end to end relationship, guideways disposed in facing relationship in the adjacent ends of the driving and driven members to provide pairs of complementary guideways, the guideways on each driving or driven member lying in a plurality of planes containing the axis of said member and having a longitudinal direction away from a beginning point on the axis at the end of the member toward an end point on the member such that an angle formed between the axis of the member and a line connecting the beginning and end points will be less than 90°, connecting means mounted between facing complementary guideways and cooperating therewith to afford a driving connection therebetween, and means for holding the connecting means in engagement with said facing complementary guideways.

6. A constant velocity universal joint comprising, in combination, a driving member and a driven member having ends in end to end relationship, raceways disposed in facing relationship in the adjacent ends of the driving and driven members to provide pairs of complementary raceways, the raceways on each driving or driven member lying in a plurality of planes containing the axis of said member and having a longitudinal direction away from a beginning point on the axis at the end of the member toward an end point on the member such that an angle formed between the axis of the member and a line connecting the beginning and end points will be less than 90°, a ball riding in each pair of complementary raceways to afford a driving connection therebetween, and a raceway maintaining the balls in engagement with the raceways on the driving and driven members.

7. A constant velocity universal joint comprising, in combination, a driving member having at one end a plurality of guideways radiating from a single point on its axis along circumferences generated from a single focus in the axis by equal radii and being in facing relationship to a like number of guideways similarly generated on an end of a driven member disposed in end to end relationship to the driving member thereby forming pairs of complementary guideways, and a driving element mounted between and engaging simultaneously both guideways of each complementary pair to afford a driving connection therebetween.

8. A constant velocity universal joint comprising, in combination, a driving member having at one end three raceways radiating from a single point on its axis along equi-distant circumferences generated from a single focus in the axis by equal radii and being in facing relationship to three complementary raceways similarly disposed and generated on an end of a driven member disposed in end to end relationship to the driving member to form pairs of complementary raceways, and a ball engaging each pair of complementary raceways to afford a driving connection therebetween.

9. A constant velocity universal joint comprising, in combination, a driving member having at one end four raceways radiating from a single point on its axis along equi-distant circumferences generated from a single focus in the axis by equal radii and being in facing relationship to four complementary raceways similarly disposed and generated by equal radii on an adjacently disposed end of a driven member to form pairs of complementary raceways, and a ball engaging each pair of complementary raceways to afford a driving connection therebetween.

10. In a constant velocity universal joint of the type described in claim 7, means for maintaining the driving member in continuous operative engagement with the respective complementary pairs of guideways.

11. A constant velocity universal joint comprising, in combination, a driving member having a hollow spherical end portion and mounted in end to end relationship to a similar hollow spherical end portion on a driven member, complementary tracks in the surfaces of the spherical portions, intermediate means engaging said tracks to establish driving relation therebetween, complementary holes through the walls of the spherical portions, and a coupling member passed through said holes and engaging the inner walls of the spherical portions to maintain the assembly in operative relationship.

12. A constant velocity universal joint comprising, in combination, two axially rotatable hollow members in end to end relationship, complemental openings through the walls of said rotatable hollow members, complementary tracks similarly generated from corresponding centers lying in the axes of each member, driving means engaging said complementary tracks at operating contact points, said points lying at all times between two planes passed through the two centers at right angles to the respective axes in which the centers lie, and means for holding said driving and driven elements in assembled relationship, said means comprising a link element passed through the openings in said rotatable hollow members and having means for engaging the inner walls of said rotatable hollow members.

13. A constant velocity universal joint comprising, in combination, two axially rotatable hollow members in end to end relationship, complemental openings through the walls of said rotatable hollow members, complementary tracks similarly generated from corresponding centers lying in the axes of each member, driving means engaging said complementary tracks at operating contact points, said points lying at all times between two planes passed through the two centers at right angles to the respective axes in which the centers lie, and means for holding said driving and driven elements in assembled relationship, said means comprising a link passed through the openings in the rotatable hollow members, head portions on each end of said link and roller means disposed between said head portions and the interior walls of the rotatable hollow members.

14. A universal joint comprising, in combination, two axially rotatable hollow members in end to end relationship, each member having a spherical outer end and an interior spherical surface concentric with said outer surface with an aperture in the axis of the rotatable member connecting said surfaces, complementary tracks similarly generated from corresponding centers lying in the axes of each axially rotatable hollow member, and a driving element engaging said complementary tracks at operating contact points, said points lying at all times between two planes passed through the two centers at right angles to the respective axes in which the centers lie, a link disposed through the two apertures of the rotatable members, said link having a head at each end thereof, guideways disposed on the surfaces of said heads and bearings disposed between said guideways and the interior spherical surface of the associated rotatable member.

WALTER E. AMBERG.